United States Patent
Nardozza

(10) Patent No.: US 11,606,115 B2
(45) Date of Patent: Mar. 14, 2023

(54) TRANSMITTER SIGNAL CANCELLATION IN PHASED ARRAY RECEIVERS

(71) Applicant: Blue Danube Systems, Inc., New Providence, NJ (US)

(72) Inventor: Gregg S. Nardozza, Madison, NJ (US)

(73) Assignee: Blue Danube Systems, Inc., New Providence, NJ (US)

(*) Notice: Subject to any disclaimer, the term of this patent is extended or adjusted under 35 U.S.C. 154(b) by 74 days.

(21) Appl. No.: 17/091,100

(22) Filed: Nov. 6, 2020

(65) Prior Publication Data

US 2021/0143862 A1     May 13, 2021

Related U.S. Application Data

(60) Provisional application No. 62/934,148, filed on Nov. 12, 2019.

(51) Int. Cl.
| | |
|---|---|
| *H04B 1/525* | (2015.01) |
| *H01Q 3/36* | (2006.01) |
| *H04L 5/14* | (2006.01) |

(52) U.S. Cl.
CPC ............ *H04B 1/525* (2013.01); *H01Q 3/36* (2013.01); *H04L 5/1461* (2013.01)

(58) Field of Classification Search
CPC ........ H04B 1/525; H04B 7/0617; H01Q 3/36; H04L 5/1461
See application file for complete search history.

(56) References Cited

U.S. PATENT DOCUMENTS

| | | | | |
|---|---|---|---|---|
| 6,091,970 | A * | 7/2000 | Dean | H04W 88/08 455/562.1 |
| 10,419,062 | B2 * | 9/2019 | Doane | H04B 1/44 |
| 2002/0111143 | A1 * | 8/2002 | Li | H01Q 3/2611 455/67.11 |
| 2004/0180633 | A1 * | 9/2004 | Nakatani | H04B 1/525 455/101 |
| 2009/0232510 | A1 * | 9/2009 | Gupta | H04B 10/25752 375/296 |

(Continued)

FOREIGN PATENT DOCUMENTS

| | | |
|---|---|---|
| WO | 2004021508 A2 | 3/2004 |
| WO | 2019069395 A1 | 4/2019 |

*Primary Examiner* — Ayaz R Sheikh
*Assistant Examiner* — Tarell A Hampton
(74) *Attorney, Agent, or Firm* — Occhiuti & Rohlicek LLP

(57) ABSTRACT

A method employing an array of antenna elements and a plurality of transceivers, each including (1) a transmitter chain; (2) a receiver chain; and (3) a duplexer having an input electrically connected to the transmitter chain, an output electrically connected to the receiver chain, and a duplexed port electrically connected to a different antenna element, the method involving: identifying among the plurality of transceivers a first and second subsets of transceivers such that together the first and second subsets of transceivers constitute all of the transceivers among the plurality of transceivers; for each transceiver within the first subset of transceivers, but not for the transceivers within the second subset of transceivers, introducing a Φ degree phase shift between the duplexed port of the duplexer and the antenna element to which the duplexed port is electrically connected, wherein $\Phi=-(2n+1)90°$, and wherein n is an integer.

13 Claims, 8 Drawing Sheets

(56) References Cited

U.S. PATENT DOCUMENTS

| | | | |
|---|---|---|---|
| 2013/0279616 A1* | 10/2013 | Lackey | H04B 7/0837 |
| | | | 375/267 |
| 2014/0036777 A1* | 2/2014 | Kokkinos | H04W 88/10 |
| | | | 370/328 |
| 2014/0269449 A1* | 9/2014 | Abramsky | H04B 1/525 |
| | | | 370/278 |
| 2015/0270864 A1* | 9/2015 | Bryant | H04L 5/14 |
| | | | 370/282 |
| 2016/0013855 A1* | 1/2016 | Campos | H04L 27/2601 |
| | | | 370/343 |
| 2016/0112226 A1* | 4/2016 | Martinez | H03C 3/12 |
| | | | 455/110 |
| 2016/0344574 A1* | 11/2016 | Choi | H04W 74/0816 |
| 2017/0005696 A1* | 1/2017 | Sjoland | H04L 43/028 |
| 2017/0187099 A1 | 6/2017 | Patel et al. | |
| 2018/0026738 A1* | 1/2018 | Pasulka | H04J 11/0033 |
| | | | 455/63.1 |

* cited by examiner

TRANSMITTER SIGNAL CANCELLATION IN PHASED ARRAY RECEIVERS

This application claims the benefit under 35 U.S.C. 119(e) of Provisional Application Ser. No. 62/934,148, filed Nov. 12, 2019, entitled "Transmitter Signal Cancellation in Phased Array Receivers," the entire contents of which are incorporated herein by reference.

TECHNICAL FIELD

The present invention generally relates to signal handling in phased array transceivers and more specifically to the attenuation of undesired signals on the receiver sides of the phased array transceivers.

BACKGROUND

In FDD (frequency division duplex) phased array systems, the transmitter signal and emissions are attenuated by way of a duplexer so that they do not desensitize the receiver. There are certain wireless bands where the duplex spacing is such that combinations of transmit carriers will result in intermodulation distortion products landing right on the respective receive channels. Although the duplexers have a large amount of transmit-to-receive attenuation, they do not always have enough for these cases and achieving higher attenuation is often impractical. In addition, these residual intermodulation products tend to add up at the output of the phased array receive combiner because all transmitter signals are in-phase, which is required for a phased array system to operate.

SUMMARY

The embodiments described herein address the above-described problem by introducing a deliberate phase shift between the duplexer and the antenna element on every other element in the array, such that the phase of the transmitter signals and distortion products are cancelled in pairs at the receiver combiner. The phase shift can be implemented with a simple delay element (e.g., quarter wavelength transmission line) or with any other phase shifting circuit arrangement.

In general, in one aspect the invention features a phased array system including: an array of antenna elements; and a plurality of transceivers, each including (1) a transmitter chain; (2) a receiver chain; and (3) a duplexer having a transmit input electrically connected to the transmitter chain, a receive output electrically connected to the receiver chain, and a duplexed port electrically connected to a corresponding different antenna element within the array of antenna elements. The plurality of transceivers includes a first subset of transceivers and a second subset of transceivers, wherein the first subset of transceivers differs from the second subset of transceivers in that each transceiver within the first subset of transceivers further comprises a $\Phi$ degree phase shifting element connected between the duplexed port of the duplexer within that transceiver and the antenna element to which the duplexed port of that duplexer is electrically connected, wherein $\Phi=-(2n+1)90°$, and wherein n is an integer.

Preferred embodiments include one or more of the following features. The quantity n=0. The number of transceivers in the first subset of transceivers and the number of transceivers in the second subset of transceivers is equal or approximately equal. The antenna elements within the array of antenna elements is organized into a plurality of columns and wherein the antenna elements in the odd numbered columns are connected to transceivers in the first subset of transceivers and the antenna elements in the even numbered columns are connected to transceivers in the second subset of transceivers. Alternatively, the antenna elements within the array of antenna elements is organized into a plurality of rows and wherein the antenna elements in the odd numbered rows are connected to transceivers in the first subset of transceivers and the antenna elements in the even numbered rows are connected to transceivers in the second subset of transceivers.

In general, in another aspect the invention features a method employing an array of antenna elements and a plurality of transceivers, each including (1) a transmitter chain; (2) a receiver chain; and (3) a duplexer having a transmit input electrically connected to the transmitter chain, a receive output electrically connected to the receiver chain, and a duplexed port electrically connected to a corresponding different antenna element within the array of antenna elements. The method includes: identifying among the plurality of transceivers a first subset of transceivers and a second subset of transceivers such that together the first and second subsets of transceivers constitute all of the transceivers among the plurality of transceivers; for each transceiver within the first subset of transceivers, but not for the transceivers within the second subset of transceivers, introducing a $\Phi$ degree phase shift between the duplexed port of the duplexer within that transceiver and the antenna element to which the duplexed port of that duplexer is electrically connected, wherein $\Phi=-(2n+1)90°$, and wherein n is an integer.

Preferred embodiments include one or more of the following features. The quantity n=0. For each transceiver among the plurality of transceivers, the transmitter chain for that transceiver defines a transmit signal path for that transceiver, and the method further involves: for each transceiver within the first subset of transceivers, but not for the transceivers within the second subset of transceivers, introducing +90 phase shift in the transmit signal path of that transceiver. Within each transceiver among the plurality of transceivers the receiver chain for that transceiver defines a receive signal path for that transceiver, and the method further includes: for each transceiver within the first subset of transceivers, but not for the transceivers within the second subset of transceivers, introducing +90 phase shift in the receive signal path of that transceiver.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
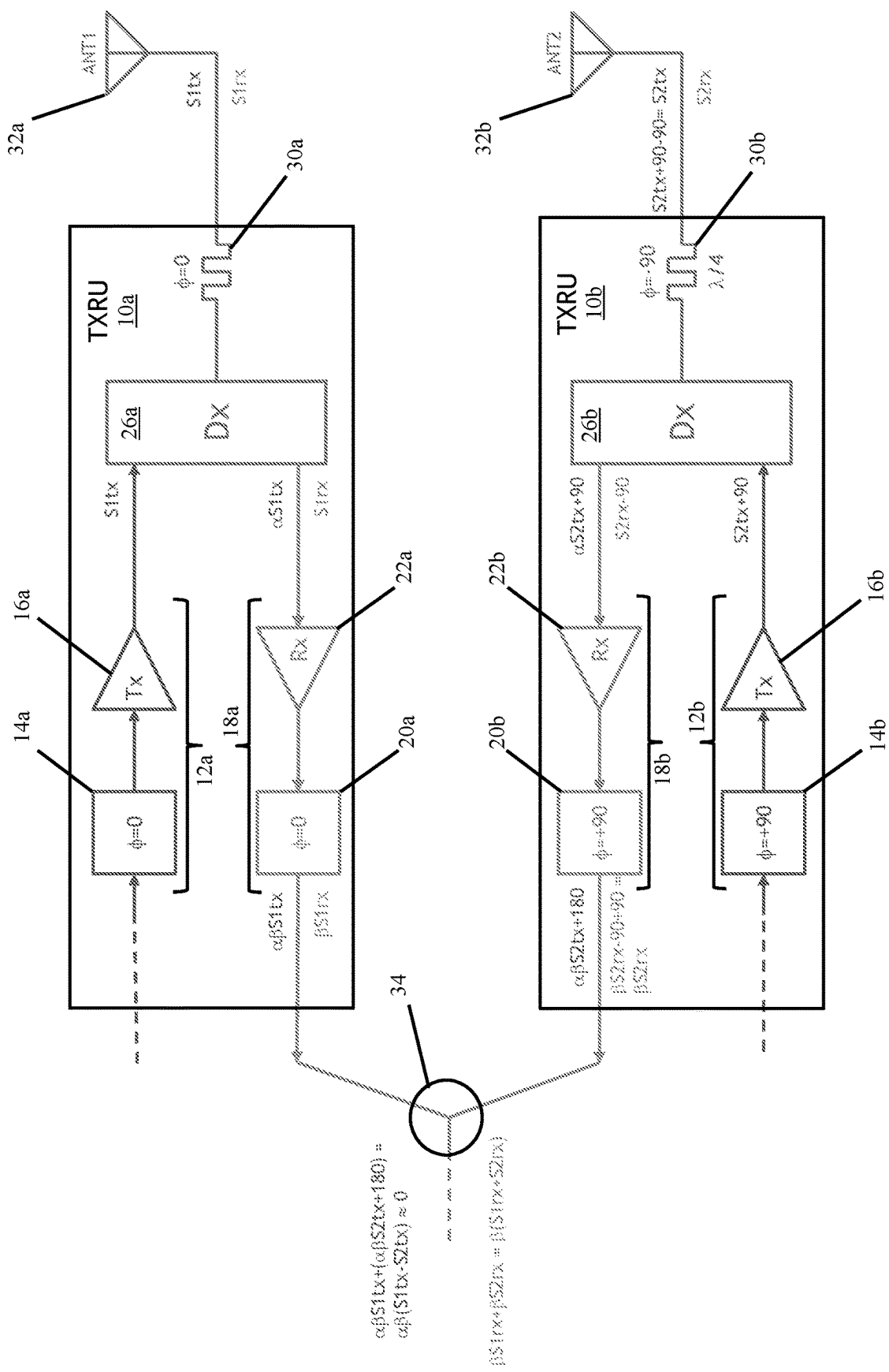
FIG. 1, using a simplified transceiver block diagram employing two array elements, illustrates the basic concept.

Referring to FIG. 1, a simplified transceiver block diagram is shown for two array elements. It shows two transceiver (TXRU) modules 10a and 10b, each of which includes an RF transmitter chain 12a, 12b (represented here by a phase rotator or phase setting block 14a, 14b and a Tx block 16a, 16b), an RF receiver chain 18a, 18b (represented here by a phase rotator or phase setting block 20a, 20b and an Rx block 22a, 22b), and a duplexer 26a, 26b connecting the transmitter and receiver chains to an antenna element 32a, 32b. The RF chains perform the digital-to-analog and analog-to-digital conversion and up-down conversion operations, among other things. The top transceiver 10a has no modifications and has no added phase shifts. (For reasons that will become apparent later, this is nevertheless represented by a phase delay element 30a which in this example introduces a 0 degree phase shift between the duplexer 26a and antenna element 32a.) The bottom transceiver 10b includes a phase delay element 30b that adds a 90° phase delay on the duplexed line between the duplexer 26b and the antenna element 32b. The phase delay can be implemented by a quarter wavelength line that gives a 90° phase shift at one frequency. Alternatively, a more complicated RF network that provides 90° phase shift across a wide band of frequencies can be used.

This phase delay introduced by phase delay element 30b in TXRU 10b is seen by both the transmit and receive signals on the duplexed line. The phase delay is compensated by phase rotators 14b and 20b which are an integral part of any phased array system and which in this case guarantee that all of the transmit signals appear in-phase at each antenna element and that the receive signals appear in-phase at the inputs of a receiver combiner (or aggregation network) 34. In other words, the phase rotators 14b and 20b introduce a +90-degree phase shift in the transmit and receive signals. The difference between the first transceiver 10a and second transceiver 10b, however, is in the phase at which the residual transmitter signals from the transceiver pair appears at the output of the receiver phase combiner 34. The residual transmitter signal from the top transceiver 10a does not experience any phase shift in either the transmit or receive path, so it appears at the output of the receiver combiner 34 with no phase shift. The residual transmitter signal from the bottom transceiver 10b experiences two phase rotations, one in the transmitter chain 12b and one in the receiver chain 18b, and thus appears at the output of the receiver combiner 34 180° out of phase with that of the top transceiver 10a, resulting in residual transmitter signal cancellation.

With the phase delay elements as shown in FIG. 1, the signals at the various locations in the two transceiver modules are as follows. Assuming the transmit signal delivered to the duplexer 26a in the upper transceiver 10a is S1tx, the signal delivered to the antenna element 32a will be S1tx and the residual signal that leaks over onto the receive path will be $\alpha$S1tx, where $\alpha$ is a measure of the coupling from the transmit side to the receive side of the duplexer 26a. Assuming the received signal is S1rx, the signal on the receiver line of the duplexer 26a will be S1rx and at the output of the receiver chain 18a will be $\beta$S1rx, where $\beta$ is a measure of the gain that is applied by the receiver chain 18a as determined by the analog beamforming precoding weights that are applied. Similarly, the residual transmit signal that appears at the output of the receiver chain 18a will be $\alpha\beta$S1tx.

In the lower transceiver 10b, the transmit signal delivered to the duplexer 26b is S2tx+90° and the signal delivered to the antenna element 32b will be S2tx+90°−90° or S2tx, as desired. The residual signal that leaks over onto the receive path will be $\alpha$S2tx+90°. Assuming the received signal is S2rx, the signal on the receiver line of the duplexer 26b will be S2rx−90° and at the output of the receiver chain 18b will be $\beta$S2rx+90°−90° or $\beta$S2tx, again as desired. Similarly, the residual transmit signal that appears at the output of the receiver chain will be $\alpha\beta$S2tx+90°+90° or $\alpha\beta$S2tx+180°, which is 180° out of phase with the residual transmit signal appearing at the output of the receiver chain 18a in the upper transceiver 10a.

When the signals supplied by the two received signals are combined by the aggregation network, or the signal combiner network 34, the result is: $\beta$S1rx+$\beta$S2rx. And the combined residual signals equal: $\alpha\beta$S1tx+($\alpha\beta$S2tx+180°). This equals $\alpha\beta$(S1tx−S2tx). If only the phases are adjusted to achieve beamforming, the magnitude of S1 equals the magnitude of S2 and the result is zero, i.e., the net residual signal is zero. If, on the other hand, both the phases and gains are adjusted to achieve beamforming (e.g. amplitude tapering is used to reduce sidelobes in the resulting beam), then S1≈S2 and the result is approximately zero which nevertheless is a significant improvement over adding signal that are in phase.

Note that in the case in which a quarter wavelength line is used to implement the phase delay element 30b between the duplexer 26b and the antenna element 32b, the resulting phase difference will differ by a small amount for frequencies that are offset from the frequency for which the quarter wavelength line is designed. Nevertheless, the resulting cancellation at the input of the combiner network 34 will still be large.

This paired element cancellation is implemented across the entire array, such that the resulting residual transmitter signal is minimized at the receive combiner output. Without this cancellation, the correlated residual transmitter signals would add linearly with the number of elements, resulting in 10 log N addition of residual power at the output of the receive combiner, potentially causing receiver desensitization.

Note that all received signals (including the unwanted residual signals that leak through the duplexers 26a, 26b) appear at the receive combiner. So, if half of the residual signals experience the 90° phase delay and half of them do not (i.e., half will be at 0° phase and half will be at 180° phase), there will be total or near total cancellation. The selection possibilities for which antenna elements receive the phase delay and which do not are many. For example, every other antenna element in the array could be selected to apply to phase delay or all of the antenna elements in every other row (or column) of the array can be selected. If the antenna array is made up of an array of antenna sub-panels, the selection might be guided in part by the way the antenna sub-panels are designed and/or assembled together.

Also note that there are other combinations of phase delays that will also mathematically produce the same results, though they may not be as practical to implement. In general, the phase shift that is applied between the duplexer and the antenna element can be $\Phi=-(2n+1)90°$, wherein n is an integer. In that case, the phase shifts that would be applied within the receiver chain and the transmitter chain would be $-\Phi$. The resulting residual transmit signal that appears at the output of the receiver chain would be $\alpha\beta S2tx+2(2n+1)90°$ which can be also written as $\alpha\beta S2tx+4n90°+2\times 90°=\alpha\beta S2tx+n360°+180°$. So, again the resulting residual signal at the output of the receiver chain is 180° out of phase with the residual signal output by the other receiver chain.

The underlying principles can be summarized as follows. The round-trip phase offset for the transmitter residual signals must be 180 degrees (or near 180 degrees) for the phase shifted elements (half of the elements). The transmitter phase shift must be net 0 degrees from the input of the transmitter to its associated antenna element. And the receiver phase shift must be net 0 degrees from its associated antenna element to the input of the receiver combiner (or equivalently, the output of the receiver chain).

Figure 2:
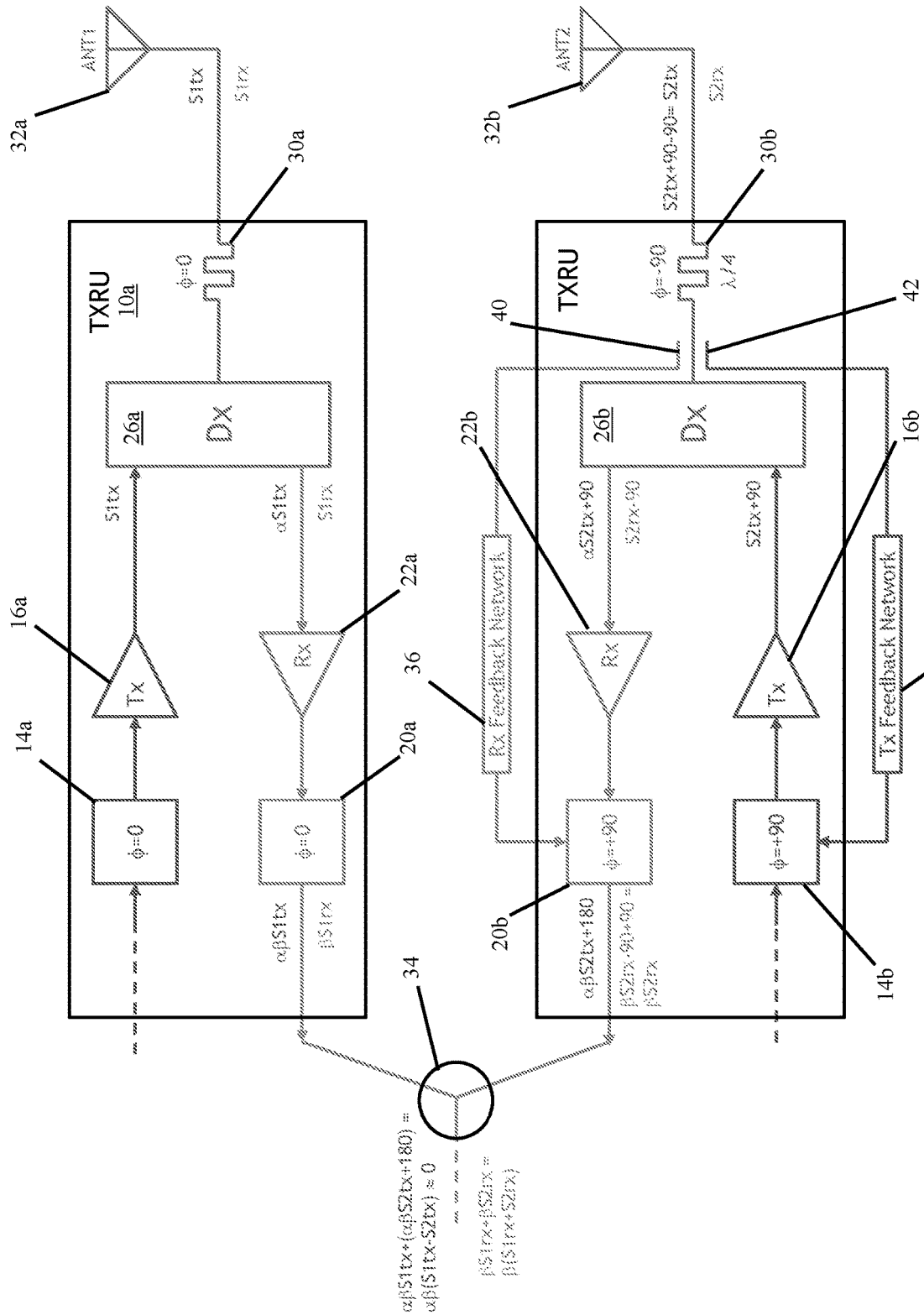
FIG. 2 illustrates an embodiment in which the delay element is outside of the calibration loop.

FIG. 2 shows the paired element transceiver cancellation block diagram with the addition of a calibration loop which adjusts the phase of the transmit and receive paths to ensure that signals to and from all elements in the array are fully correlated and coherent. The calibration loop on the receive side includes an Rx feedback network 36 that senses the signal on the output line of the duplexer 26b via a sensor element 40 and provides a feedback signal to the phase setting element 20b. The calibration loop on the transmit side includes a Tx feedback network 38 that senses the signal on the output line of the duplexer 26b via a sensor element 42 and provides a feedback signal to the phase setting element 14b. In this case, the phase shift introduced by phase delay element 30b is outside the calibration loops, requiring a manual adjustment of the transmit and receive path phase rotators for compensation. More specifically, the feedback for the calibration loop is taken from a location that is between the duplexer 26b and the phase delay element 30b. This is not the optimal solution, but it is workable.

Note that the Rx and Tx feedback networks 36, 38 in the calibration loops are implemented in known ways. For example, see the following patents which disclose some approaches: U.S. Pat. No. 10,225,067, entitled "Active Array Calibration," by Mihai Banu and Yiping Feng, issued Mar. 5, 2019; and U.S. Pat. No. 10,009,165, entitled "Calibrating A Serial Interconnection", by Mihai Banu, issued Jun. 26, 2018, both of which are incorporated herein in their entirety by reference.

Figure 3:
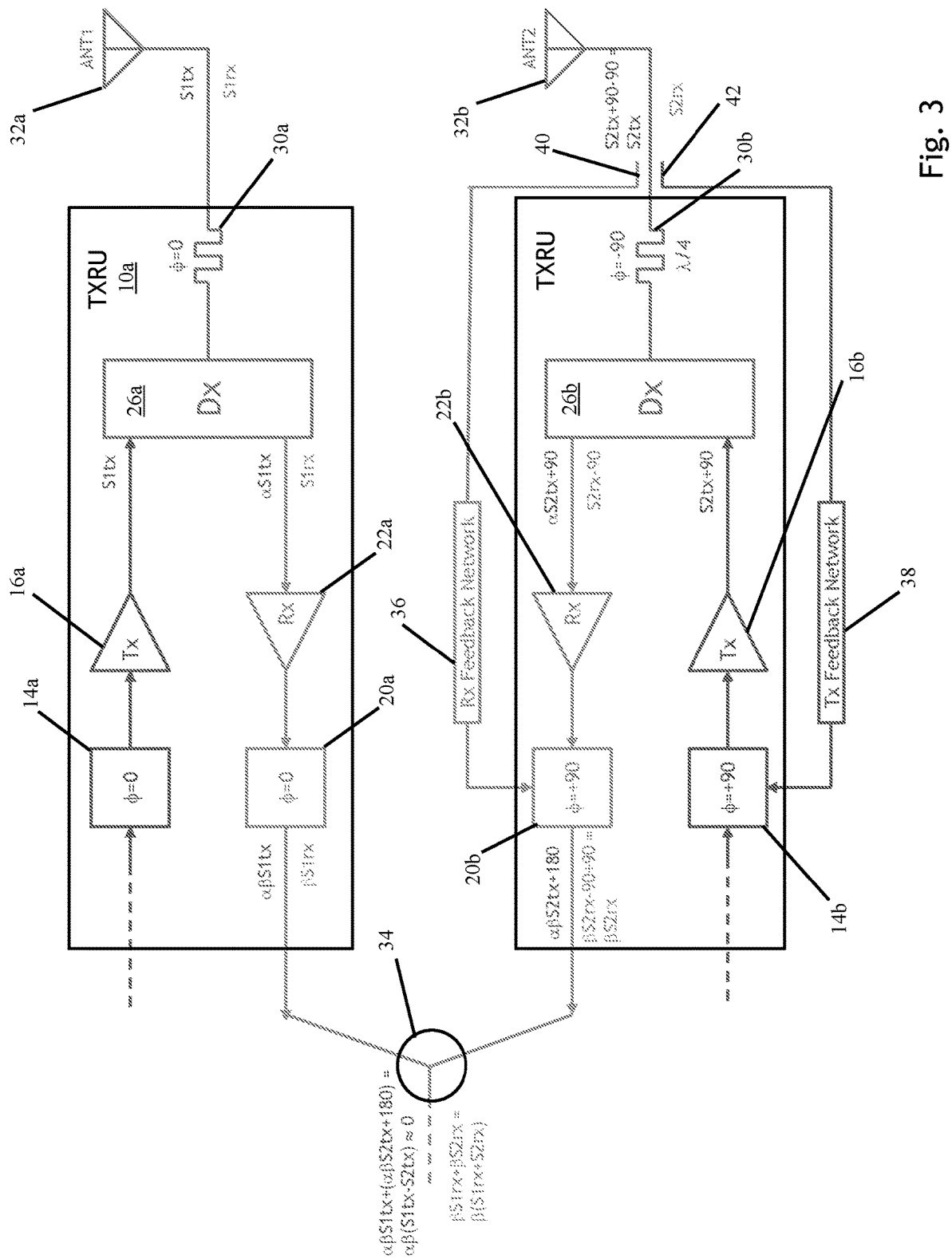
FIG. 3 illustrates an embodiment in which the delay element is inside of the calibration loop.

FIG. 3 shows the paired element transceiver cancellation block diagram with the phase delay element 30b inside the calibration loop so that compensation is automatically taken care of as part of the phased array system calibration. More specifically, the feedback for the calibration loop is taken from a location that is between the phase delay element 30b and the antenna element 32b.

Figure 4:
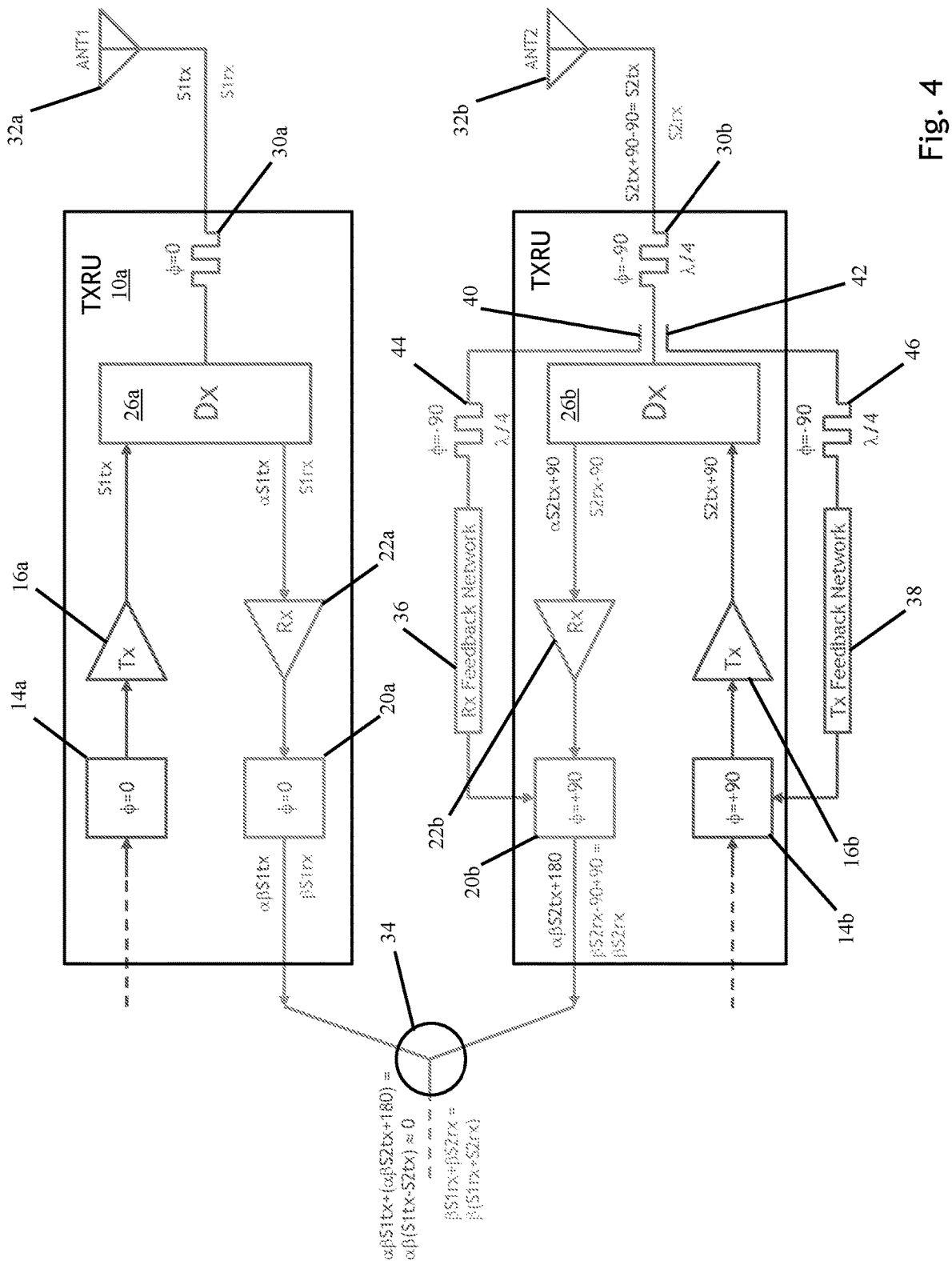
FIG. 4 illustrates an embodiment in which the delay element is inside of the feedback network.

FIG. 4 shows the paired element transceiver cancellation block diagram which excludes the added phase delay element 30b, but with the addition of commensurate phase shift elements 44, 46 added as part of the feedback loops. This alternative is shown for cases where it may not be advantageous or possible to have the feedback sense point after the added phase shift element.

An example of an analog phased array system in which the above-described approach can be implemented is shown in FIGS. 5-8.

Figure 5:
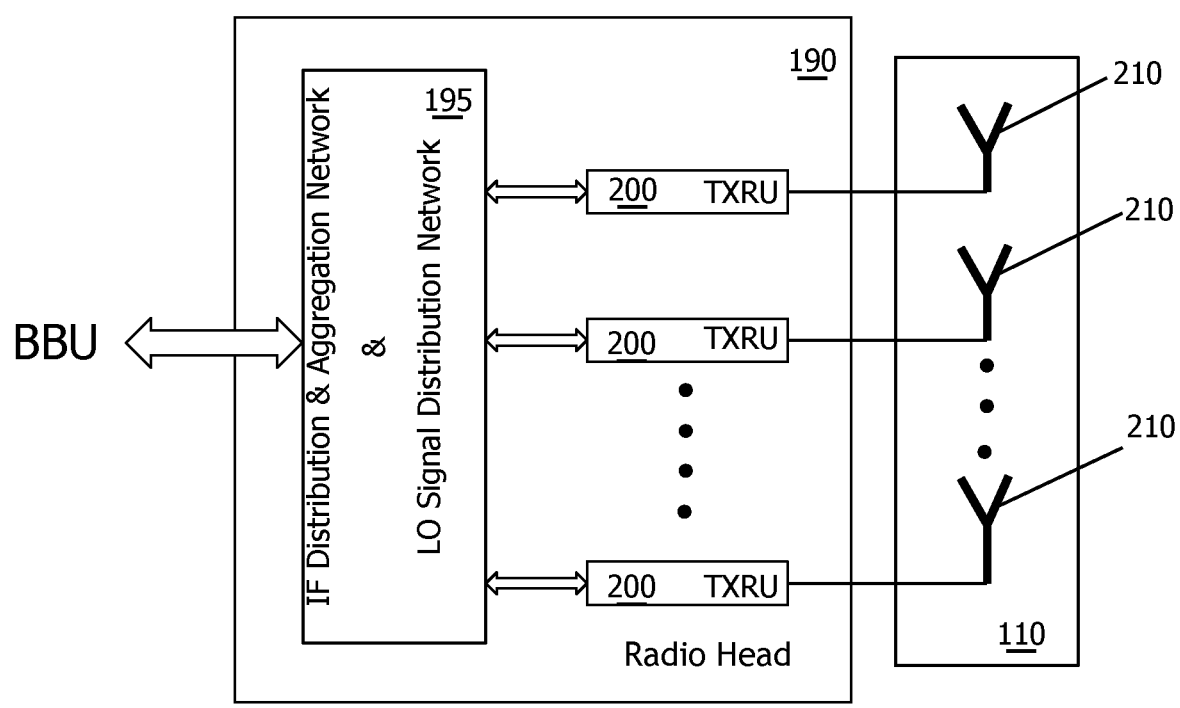
FIG. 5 is an exemplary high-level block diagram showing the internal structure of an exemplary radio head and phased array antenna.

Referring to FIG. 5, the antenna array 110 includes a two-dimensional array of M antenna elements. The radio head 190 includes multiple front-end modules (TXRU modules) 200, equal in number to the number of antenna elements in the array, namely, M. There is a TXRU module 200 for each antenna element. There is also a signal distribution network 195 that includes an IF distribution network and an LO signal distribution network. This signal distribution network 195 delivers transmit signals from the BBU to the TXRU modules 200, delivers received signals from the TXRU modules 200 to the BBU, and provides coherent local oscillator signals to the TXRU modules 200 for up-converting IF transmit signals to RF transmit signals and for down-converting RF received signals to IF received signals.

Figure 6:
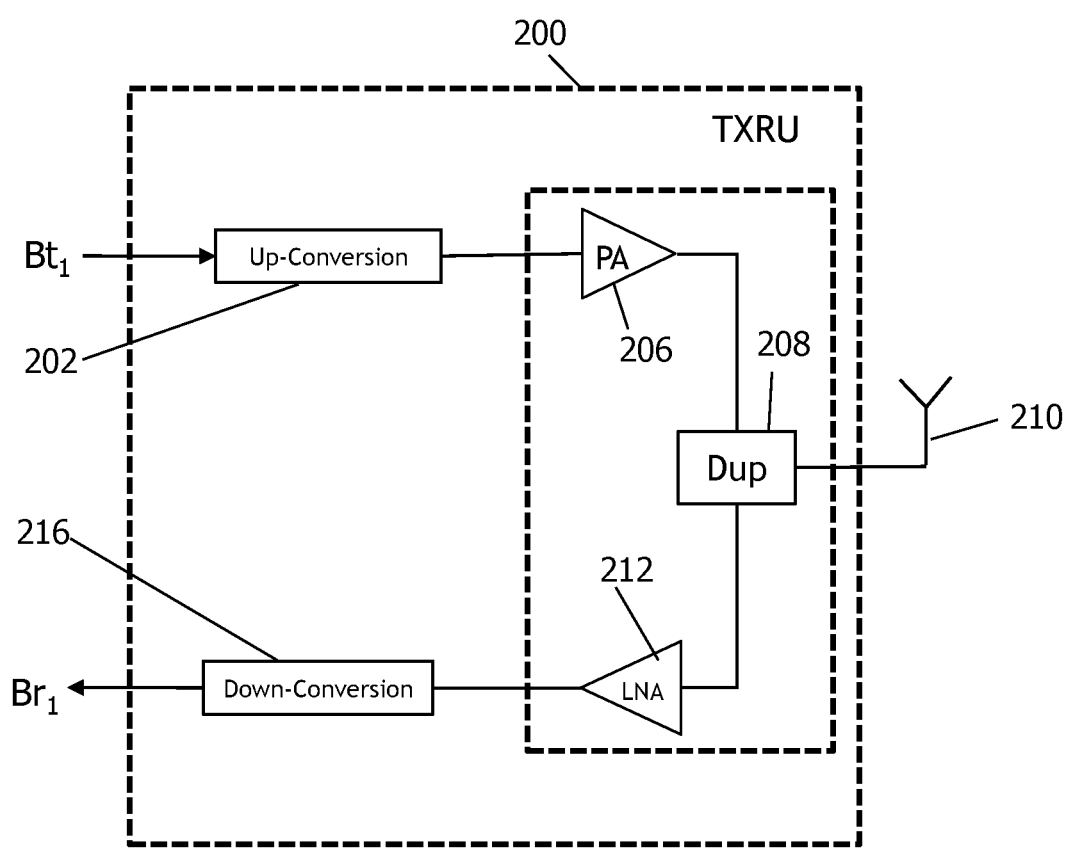
FIG. 6 is an exemplary high-level block diagram of a Tx/Rx module such as is shown in FIG. 5.

FIG. 6 shows a block diagram of the circuitry that connects to a single antenna element 210 of the multi-element antenna array. In the antenna array system having M antenna elements, this circuitry is duplicated for each antenna element. For each antenna element 210, there is a front-end module (or TXRU module) 200 connected to the antenna element 210. The front-end module has a transmitter side and a receiver side. The transmitter side includes N up-conversion modules 202 and a power amplifier (PA) 206. The receiver side includes a low noise amplifier (LNA) 212, and N down-conversion modules 216. The N up-conversion modules 202 enable the array to generate N independent transmit beams and the N down-conversion modules 216 enable the array to generate N independent receive beams. (Note: In the case of the illustrated example, which is capable of generating only one beam, N=1.)

The front-end module 200 also includes a duplexer circuit 208 that couples the drive signal from the PA 206 on the transmitter side to the antenna element 210 and couples a received signal from the antenna element 210 to the LNA 212 on the receiver side. The input of the up-conversion module 202 is for receiving a beam transmit signal stream $Bt_1$ from the baseband unit (not shown). And the output of the down-conversion module 216 is for outputting a beam received signal stream $Br_1$.

Figure 7:
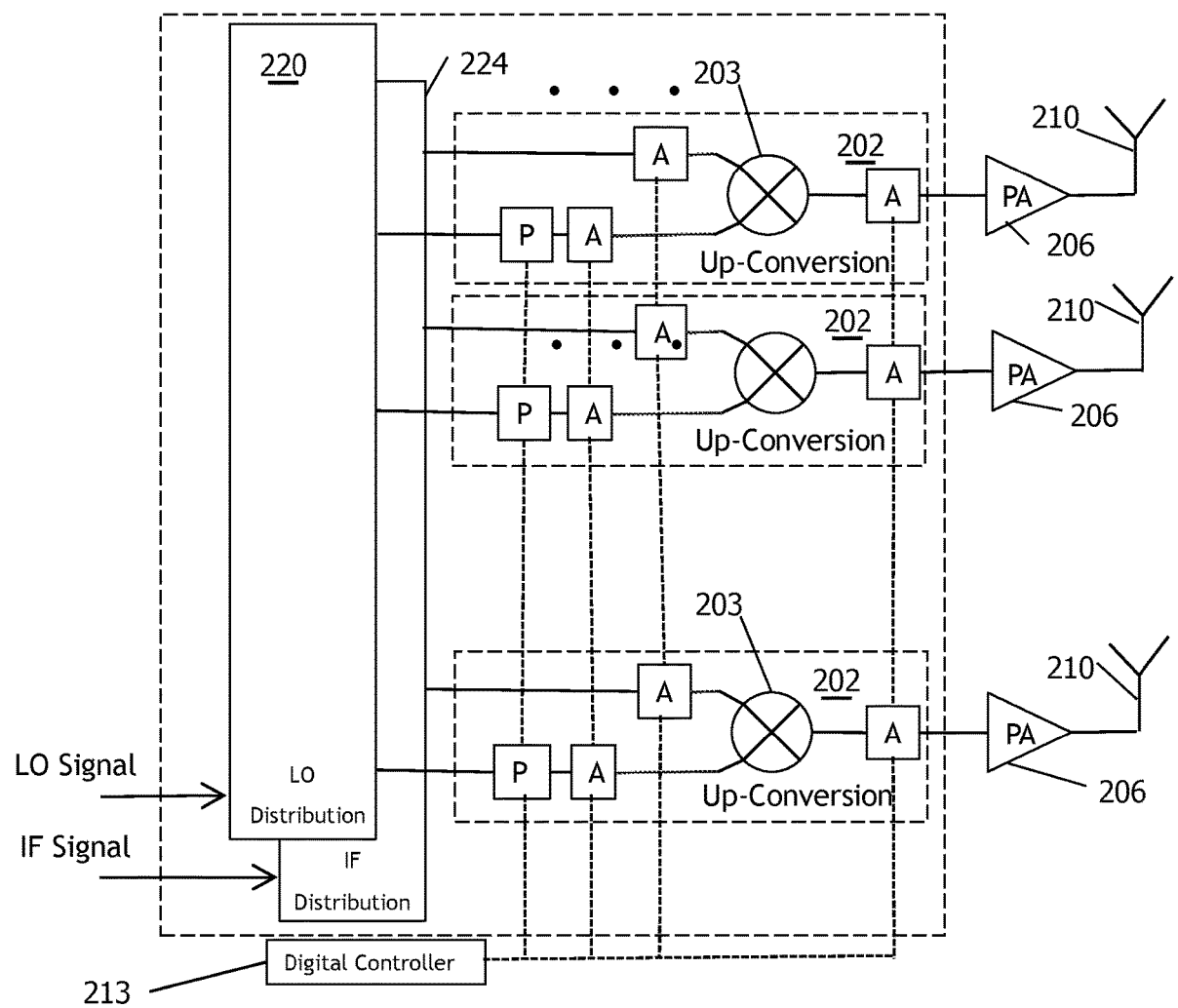
FIG. 7 is an exemplary block diagram of the transmitter side of an active antenna array system showing the circuitry for only one of multiple transmit beams.
Figure 8:
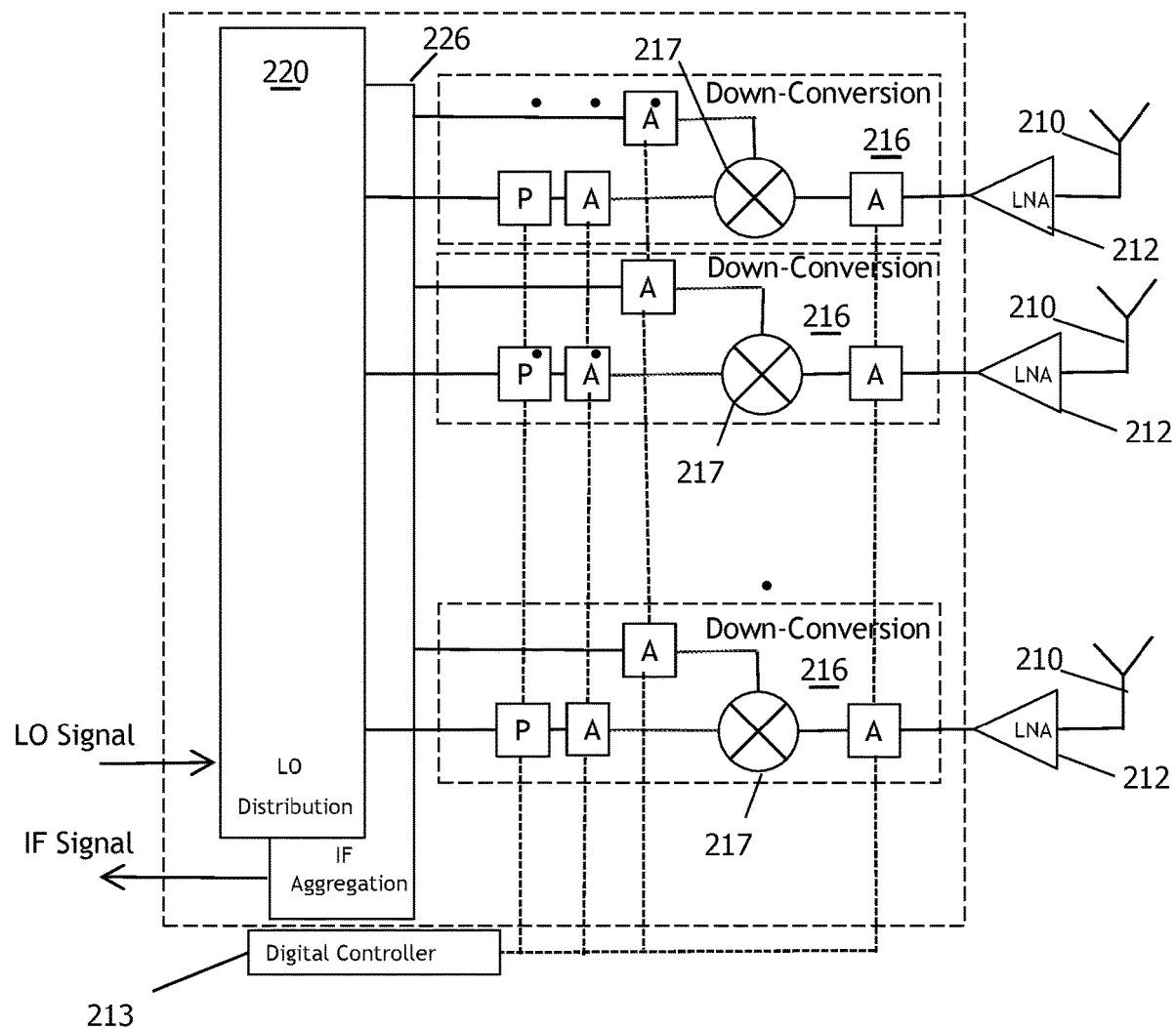
FIG. 8 is an exemplary block diagram of the receiver side of an active antenna array system showing the circuitry for only one of multiple receive beams.

An active antenna array system in which the up-conversion modules 202 are shown in greater detail is depicted in FIG. 7; and an active antenna array system in which the down-conversion modules 216 are shown in greater detail is depicted in FIG. 8. As a practical matter, these two systems, which are shown separately, would be implemented in the same active antenna array system but to simplify the figures, they are presented here separately. The active antenna array system of FIG. 7 is for transmitting one transmit signal stream over a single transmit beam that is generated by the M elements 210 of the antenna array. Similarly, the active antenna array system of FIG. 8 is for receiving a signal stream on a single receive beam pattern that is generated by the antenna array.

There is an LO distribution network 220 for distributing a coherent or phase synchronized LO (local oscillator) signal to the M up-conversion modules 202 and the M down-conversion modules 216. As shown in FIG. 7, there is also an IF distribution network 224 for delivering the IF transmit signal to each of the up-conversion modules 202. And as shown in FIG. 8, there is an IF aggregation network 226 for aggregating the received signals from each of the down-conversion modules 216.

The distribution and aggregation networks may be passive linear reciprocal networks with electrically identical paths to ensure the coherent distribution/aggregation of signals. Alternatively, one or more of these networks may be implemented using the bidirectional signaling network described in U.S. Pat. No. 8,259,884, entitled "Method and System for Multi-Point Signal Generation with Phase Synchronized Local Carriers," filed Jul. 21, 2008 and U.S. Pat. No. 8,622,959, entitled "Low Cost, Active Antenna Arrays," filed Jun. 30, 2011 or the serial interconnection approach described in U.S. Pat. No. 9,673,965, entitled "Calibrating a Serial Interconnection," filed Sep. 8, 2016, the contents of all of which are incorporated herein by reference.

In general, each up-conversion module 202 includes a mixer 203 and various amplitude and phase setting circuits identified by A and P, respectively. The LO signal and the distributed IF transmit signal stream are both provided to the mixer 203 which up-converts the IF transmit signal stream to an RF transmit signal stream that is provided to the power amplifier 206. Similarly, each down-conversion module 216 also includes a mixer 217 and various amplitude and phase setting circuits similarly identified by A and P, respectively. The mixer 217 in the down-conversion module 216 multiplies the LO signal provided by the LO distribution network 220 and the received RF signal stream from the low noise amplifier 212 that is coupled to the antenna element 210 to generate a down-converted IF received signal stream. The down-converted IF signal stream is provided to the IF aggregation network 226 for aggregation with the IF received signal streams from the other antenna elements and for transfer back to the base station.

The amplitude and phase setting circuits A and P are used for changing the relative phase or amplitude of individual antenna signals to thereby establish the size, direction, and intensity of the transmit and receive beam patterns that are generated by the antenna array. (Note: In an antenna array, a transmit beam is a radiation pattern that is generated by the antenna array. That radiation pattern can be measured in front of the antenna array. In contrast, a receive beam is not a radiation pattern formed by the antenna array but rather is a pattern of antenna sensitivity. Nevertheless, in spite of this difference, they are both generally referred to as beams.) The amplitude setting circuit is basically equivalent to a variable gain amplifier in which the ratio of the output signal amplitude to the input signal amplitude is programmable and is set by electronic control. The phase setting circuit has the fundamental capability of shifting the input signal in phase (or time) under electronic control. These amplitude and phase setting circuits are controlled by digital control signals (a.k.a. a beamforming precoding vector) supplied by a separate control processor 213.

The typology of the amplitude-setting and phase-setting circuits shown in FIGS. 7 and 8 is just one of many possibilities for giving the basic transmitter and receiver the capability to control independently the amplitude and phase values of the individual antenna signals. The number and placement of the amplitude and phase setting circuits can vary from what is illustrated in FIGS. 7 and 8. In addition, there are other components which might be present in the up-conversion and down-conversion modules but which are not shown in the figures because they are well known to persons skilled in the art. These might include, for example, channel IF filters and automatic gain controls.

Other embodiments are within the following claims. For example, the above described embodiments involve up-converting an IF signal to RF within the RF transmitter chain in which case the phase rotations are applied after up-conversion in the transmitter chain (or before down-conversion in the receiver chain). Alternatively, the up-converted RF signal could be supplied by the signal distribution network, in which case up and down conversion would not take place in the transceiver modules.

What is claimed is:

1. A phased array system comprising:
   an array of antenna elements; and
   a plurality of transceivers, each including (1) a transmitter chain; (2) a receiver chain; and (3) a duplexer having a transmit input electrically connected to the transmitter chain, a receive output electrically connected to the receiver chain, and a duplexed port electrically connected to a corresponding different antenna element within the array of antenna elements,
   wherein the plurality of transceivers constitutes a first subset of transceivers and a second subset of transceivers, wherein the first subset of transceivers differs from the second subset of transceivers in that each transceiver within the first subset of transceivers further comprises a $\Phi$ degree phase shifting element connected between the duplexed port of the duplexer within that transceiver and the antenna element to which the duplexed port of that duplexer is electrically connected, wherein $\Phi=-(2n+1)$ 90°, and wherein n is an integer.

2. The phased array system of claim 1, wherein n=0.

3. The phased array system of claim 1, wherein the number of transceivers in the first subset of transceivers and the number of transceivers in the second subset of transceivers differ.

4. The phased array system of claim 1, wherein the number of transceivers in the first subset of transceivers and the number of transceivers in the second subset of transceivers are equal.

5. The phased array system of claim 1, wherein the antenna elements within the array of antenna elements are organized into a plurality of columns, wherein the antenna elements in the odd numbered columns are connected to transceivers in the first subset of transceivers, and wherein the antenna elements in the even numbered columns are connected to transceivers in the second subset of transceivers.

6. The phased array system of claim 1, wherein the antenna elements within the array of antenna elements are organized into a plurality of rows, wherein the antenna elements in the odd numbered rows are connected to transceivers in the first subset of transceivers, and wherein the antenna elements in the even numbered rows are connected to transceivers in the second subset of transceivers.

7. A method employing an array of antenna elements and a plurality of transceivers, each including (1) a transmitter chain; (2) a receiver chain; and (3) a duplexer having a transmit input electrically connected to the transmitter chain, a receive output electrically connected to the receiver chain, and a duplexed port electrically connected to a corresponding different antenna element within the array of antenna elements, said method comprising:
   identifying among the plurality of transceivers a first subset of transceivers and a second subset of transceivers such that together the first and second subsets of transceivers constitute all of the transceivers among the plurality of transceivers;
   for each transceiver within the first subset of transceivers, but not for the transceivers within the second subset of transceivers, introducing a $\Phi$ degree phase shift between the duplexed port of the duplexer within that transceiver and the antenna element to which the duplexed port of that duplexer is electrically connected, wherein $\Phi=-(2n+1)90°$, and wherein n is an integer.

8. The method of claim 7, wherein n=0.

9. The method of claim 8, wherein, within each transceiver among the plurality of transceivers the transmitter chain for that transceiver defines a transmit signal path for that transceiver and wherein the method further comprises, for each transceiver within the first subset of transceivers, but not for the transceivers within the second subset of transceivers, introducing a +90° phase shift in the transmit signal path of that transceiver.

10. The method of claim 9, wherein within each transceiver among the plurality of transceivers the receiver chain for that transceiver defines a receive signal path for that transceiver, and wherein the method further comprises, for each transceiver within the first subset of transceivers, but not for the transceivers within the second subset of transceivers, introducing a +90° phase shift in the receive signal path of that transceiver.

11. A phased array system comprising:
an array of antenna elements,
a first transceiver subset that comprises at least one transceiver, and
a second transceiver subset that comprises at least one transceiver,
wherein each of the transceivers comprises
a transceiver input,
a transmitter chain that receives a transmit signal via the transceiver input,
a transceiver output;
a receiver chain that carries a residual transmit signal and a receive signal to the transceiver output,
a duplexer having a transmit-input electrically coupled to the transceiver input via the transmitter chain, a receive-output electrically coupled to the transceiver output to the receiver chain, and a duplexed port electrically connected to a corresponding antenna element within the array, and
wherein a residual path is defined between the transceiver input and the transceiver output;
wherein for each transceiver in the first subset there exists a transceiver in the second subset such that the residual paths of the first and second transceivers differ by 180° in phase at an operating frequency of the phased array system.

12. The phased array system of claim 1, wherein the number of transceivers in the first subset of transceivers and the number of transceivers in the second subset of transceivers differ.

13. The phased array system of claim 1, wherein the number of transceivers in the first subset of transceivers and the number of transceivers in the second subset of transceivers are equal.

* * * * *